United States Patent
Pinciuc et al.

(10) Patent No.: US 10,790,699 B2
(45) Date of Patent: Sep. 29, 2020

(54) CONFIGURABLE WIRELESS TRANSMITTER DEVICE

(71) Applicant: Apple Inc., Cupertino, CA (US)

(72) Inventors: Christopher M. Pinciuc, Cupertino, CA (US); Brandon R. Garbus, Santa Clara, CA (US); Steven G. Herbst, Berkeley, CA (US); Todd K. Moyer, Portland, OR (US); Chad A. Bossetti, Santa Clara, CA (US); Eric S. Jol, San Jose, CA (US); Christopher S. Graham, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/258,464

(22) Filed: Jan. 25, 2019

(65) Prior Publication Data

US 2019/0319475 A1    Oct. 17, 2019

Related U.S. Application Data

(63) Continuation of application No. 16/189,955, filed on Nov. 13, 2018, now abandoned, which is a
(Continued)

(51) Int. Cl.
*H02J 7/02* (2016.01)
*H02J 50/90* (2016.01)
(Continued)

(52) U.S. Cl.
CPC ............ *H02J 50/00* (2016.02); *H02J 50/10* (2016.02); *H02J 50/12* (2016.02); *H02J 50/40* (2016.02);
(Continued)

(58) Field of Classification Search
CPC .. H02J 7/025; H02J 50/90; H02J 50/40; H02J 50/70; H02J 50/10; H02J 50/12; H02J 7/0029; H02J 7/00302; H02J 7/0042
See application file for complete search history.

(56) References Cited

U.S. PATENT DOCUMENTS

| 3,502,809 A | 3/1970 | Dickey |
| 4,785,136 A | 11/1988 | Mollet |

(Continued)

FOREIGN PATENT DOCUMENTS

| CN | 101202277 | 6/2008 |
| CN | 101447683 | 6/2009 |

(Continued)

*Primary Examiner* — Stacy Whitmore
(74) *Attorney, Agent, or Firm* — Brownstein Hyatt Farber Schreck, LLP

(57) ABSTRACT

A wireless transmitter device is configurable and operable to transfer energy to multiple receiver devices at the same time. The transmitter device is configured to enable one or more sections of a charging surface to transfer energy by selectively choosing one or more conductive traces in the transmitter device based on the position of the receiver device on the charging surface. The size and shape of each section of the charging surface that is used to transfer energy to a receiver device can change dynamically based on each receiver device. Additionally, the process of transferring energy to each receiver device may be adjusted during energy transfer based on conditions specific to each receiver device.

20 Claims, 12 Drawing Sheets

Related U.S. Application Data continuation of application No. 15/274,610, filed on Sep. 23, 2016, now Pat. No. 10,158,244.

(60) Provisional application No. 62/232,280, filed on Sep. 24, 2015.

(51) Int. Cl.
| | |
|---|---|
| *H02J 50/40* | (2016.01) |
| *H02J 50/70* | (2016.01) |
| *H02J 50/10* | (2016.01) |
| *H02J 50/12* | (2016.01) |
| *H02J 7/00* | (2006.01) |
| *H02J 50/00* | (2016.01) |

(52) U.S. Cl.
CPC .............. *H02J 50/70* (2016.02); *H02J 50/90* (2016.02); *H02J 7/0029* (2013.01); *H02J 7/0042* (2013.01); *H02J 7/00302* (2020.01); *H02J 50/001* (2020.01); *H02J 50/005* (2020.01)

(56) References Cited

U.S. PATENT DOCUMENTS

| | | | |
|---|---|---|---|
| 4,871,220 A | 10/1989 | Kohin | |
| 5,373,102 A | 12/1994 | Ehrlich et al. | |
| 5,384,575 A | 1/1995 | Wu | |
| 5,496,966 A | 3/1996 | Hightower et al. | |
| 5,545,844 A | 8/1996 | Plummer, III | |
| 5,563,614 A | 10/1996 | Alden | |
| 5,760,584 A | 6/1998 | Frederick | |
| 6,144,512 A | 11/2000 | Eden | |
| 6,269,247 B1 | 7/2001 | Chiodini | |
| 6,449,181 B1 | 9/2002 | Rieger et al. | |
| 6,492,587 B1 | 12/2002 | Yoshinaga | |
| 6,724,950 B2 | 4/2004 | Byrne | |
| 6,768,051 B2 | 7/2004 | Wiltshire | |
| 6,864,419 B2 | 3/2005 | Lovens | |
| 6,927,574 B2 | 8/2005 | Young | |
| 7,035,087 B2 | 4/2006 | Tan | |
| 7,068,140 B2 | 6/2006 | Chou | |
| 7,170,363 B2 | 1/2007 | Wiltshire | |
| 7,466,077 B2 | 12/2008 | Joo et al. | |
| 7,639,206 B2 | 12/2009 | Behdad | |
| 7,679,205 B1 | 3/2010 | Burns | |
| 7,705,591 B2 | 4/2010 | Geren et al. | |
| 7,732,038 B2 | 6/2010 | Naito et al. | |
| 7,737,370 B2 | 6/2010 | Aoyama et al. | |
| 7,791,311 B2 | 9/2010 | Sagoo | |
| 7,906,936 B2 | 3/2011 | Azancot et al. | |
| 7,948,208 B2 | 5/2011 | Partovi et al. | |
| 7,948,781 B2 | 5/2011 | Esaka et al. | |
| 7,952,322 B2 | 5/2011 | Partovi et al. | |
| 8,013,568 B2 | 9/2011 | Park et al. | |
| 8,050,063 B2 | 11/2011 | Wagoner et al. | |
| 8,101,931 B2 | 1/2012 | Blandford, III | |
| 8,115,448 B2 * | 2/2012 | John | A61N 1/3785 |
| | | | 320/108 |
| 8,169,185 B2 | 5/2012 | Partovi et al. | |
| 8,193,769 B2 | 6/2012 | Azancot et al. | |
| 8,262,244 B2 | 9/2012 | Metcalf | |
| 8,338,990 B2 | 12/2012 | Baarman et al. | |
| 8,421,274 B2 | 4/2013 | Sun et al. | |
| 8,436,317 B1 | 5/2013 | Chen | |
| 8,531,153 B2 | 9/2013 | Baarman et al. | |
| 8,587,154 B2 | 11/2013 | Fells et al. | |
| 8,629,652 B2 | 1/2014 | Partovi et al. | |
| 8,629,654 B2 | 1/2014 | Partovi et al. | |
| 8,723,053 B2 | 5/2014 | Winch | |
| 8,729,734 B2 | 5/2014 | Widmer et al. | |
| 8,760,113 B2 | 6/2014 | Keating et al. | |
| 8,779,745 B2 | 7/2014 | Brown | |
| 8,810,196 B2 | 8/2014 | Ettes et al. | |
| 8,836,276 B2 | 9/2014 | Prescott | |
| 8,838,022 B2 | 9/2014 | Dobyns | |
| 8,890,470 B2 | 11/2014 | Partovi | |
| 8,896,264 B2 | 11/2014 | Partovi | |
| 8,901,881 B2 | 12/2014 | Partovi | |
| 8,928,284 B2 | 1/2015 | Carobolante | |
| 8,947,047 B2 | 2/2015 | Partovi et al. | |
| 8,947,892 B1 | 2/2015 | Lam | |
| 9,001,031 B2 | 4/2015 | Lo et al. | |
| 9,024,576 B2 | 5/2015 | Maenpaa | |
| 9,025,143 B2 | 5/2015 | Hahn | |
| 9,041,152 B2 | 5/2015 | Luo et al. | |
| 9,065,423 B2 * | 6/2015 | Ganem | H02J 50/50 |
| 9,071,062 B2 | 6/2015 | Whitehead | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,118,203 B2 | 8/2015 | Davis | |
| 9,124,126 B2 | 9/2015 | Ichikawa | |
| 9,153,998 B2 | 10/2015 | Mayo | |
| 9,171,555 B2 | 10/2015 | Meloche | |
| 9,177,716 B2 | 11/2015 | Goto | |
| 9,178,369 B2 | 11/2015 | Partovi | |
| 9,209,627 B2 | 12/2015 | Baarman et al. | |
| 9,217,323 B2 | 12/2015 | Clark | |
| 9,276,437 B2 | 3/2016 | Partovi et al. | |
| 9,281,759 B2 | 3/2016 | Lee et al. | |
| 9,300,147 B2 | 3/2016 | Lee et al. | |
| 9,356,659 B2 | 5/2016 | Partovi | |
| 9,461,501 B2 | 10/2016 | Partovi et al. | |
| 9,496,732 B2 | 11/2016 | Partovi | |
| 9,497,894 B1 | 11/2016 | Ramsey | |
| 9,548,158 B2 | 1/2017 | Groves et al. | |
| 9,577,440 B2 | 2/2017 | Partovi et al. | |
| 9,577,460 B2 | 2/2017 | Park | |
| 9,625,545 B2 | 4/2017 | Dumoulin et al. | |
| 9,698,467 B2 | 7/2017 | Mitchell | |
| 9,711,272 B2 * | 7/2017 | Hassan-Ali | H01F 27/2804 |
| 9,722,447 B2 | 8/2017 | Partovi | |
| 9,726,518 B2 | 8/2017 | Widmer et al. | |
| 9,735,628 B2 | 8/2017 | Efe et al. | |
| 9,748,326 B2 | 8/2017 | Yen et al. | |
| 9,762,083 B2 | 9/2017 | Nam et al. | |
| 9,793,721 B2 | 10/2017 | Partovi et al. | |
| 9,831,686 B2 | 11/2017 | Kohara et al. | |
| 9,837,846 B2 | 12/2017 | Partovi | |
| 9,841,956 B2 | 12/2017 | Bornheimer et al. | |
| 9,859,079 B2 | 1/2018 | Jarrahi et al. | |
| 9,862,282 B2 | 1/2018 | Boser et al. | |
| 9,893,553 B2 * | 2/2018 | Pudipeddi | H02J 7/025 |
| 9,905,360 B2 | 2/2018 | Muntean et al. | |
| 9,912,197 B2 | 3/2018 | Riehl | |
| 9,917,479 B2 | 3/2018 | Bronson et al. | |
| 10,008,881 B2 | 6/2018 | Lee et al. | |
| 10,027,150 B2 | 7/2018 | Kvols | |
| 10,044,232 B2 | 8/2018 | Crosby et al. | |
| 10,079,090 B2 | 9/2018 | Teggatz et al. | |
| 10,090,709 B2 | 10/2018 | Matsumoto et al. | |
| 10,135,303 B2 | 11/2018 | Moyer et al. | |
| 10,141,785 B2 | 11/2018 | Son et al. | |
| 10,158,244 B2 * | 12/2018 | Pinciuc | H02J 50/90 |
| 10,277,442 B2 | 4/2019 | Kim et al. | |
| 10,477,741 B1 | 11/2019 | Bae et al. | |
| 2002/0137473 A1 | 9/2002 | Jenkins | |
| 2004/0021376 A1 | 2/2004 | Beulich | |
| 2008/0067914 A1 | 3/2008 | Kim et al. | |
| 2009/0052721 A1 | 2/2009 | Dabrowski | |
| 2010/0015918 A1 | 1/2010 | Liu et al. | |
| 2011/0164471 A1 | 7/2011 | Baarman | |
| 2012/0104997 A1 | 5/2012 | Carobolante | |
| 2012/0112552 A1 * | 5/2012 | Baarman | H02J 7/025 |
| | | | 307/104 |
| 2012/0235636 A1 * | 9/2012 | Partovi | H02J 50/12 |
| | | | 320/108 |
| 2012/0256585 A1 * | 10/2012 | Partovi | H01F 5/003 |
| | | | 320/108 |
| 2013/0043734 A1 | 2/2013 | Stone et al. | |
| 2013/0093388 A1 | 4/2013 | Partovi | |

(56) References Cited

U.S. PATENT DOCUMENTS

| | | |
|---|---|---|
| 2013/0119929 A1 | 5/2013 | Partovi |
| 2013/0260677 A1 | 10/2013 | Partovi |
| 2013/0271069 A1 | 10/2013 | Partovi |
| 2013/0285605 A1 | 10/2013 | Partovi |
| 2013/0300204 A1 | 11/2013 | Partovi |
| 2014/0191568 A1 | 7/2014 | Partovi |
| 2015/0091498 A1* | 4/2015 | Abdelmoneum ....... H02J 50/40 320/107 |
| 2015/0097530 A1* | 4/2015 | Scarlatti ............. B60L 11/1827 320/109 |
| 2015/0130412 A1 | 5/2015 | Partovi |
| 2015/0303707 A1 | 10/2015 | McCauley et al. |
| 2016/0036261 A1 | 2/2016 | Lenive |
| 2016/0064137 A1 | 3/2016 | Perez et al. |
| 2016/0172894 A1 | 6/2016 | Khripkov et al. |
| 2016/0181853 A1 | 6/2016 | Yang et al. |
| 2016/0284465 A1 | 9/2016 | Maniktala |
| 2016/0308397 A1* | 10/2016 | Jung ....................... H02J 50/12 |
| 2017/0011837 A1* | 1/2017 | Hassan-Ali ......... H01F 27/2804 |
| 2017/0092409 A1 | 3/2017 | Graham |
| 2017/0279305 A1 | 9/2017 | Staring et al. |
| 2017/0353046 A1 | 12/2017 | Chen et al. |
| 2018/0062442 A1 | 3/2018 | Qiu et al. |
| 2018/0198318 A1 | 7/2018 | Jain et al. |
| 2018/0226822 A1* | 8/2018 | Seo ....................... H02J 7/0047 |
| 2018/0343042 A1 | 11/2018 | Luzinski et al. |
| 2019/0058348 A1* | 2/2019 | Wang ....................... H02J 50/10 |

FOREIGN PATENT DOCUMENTS

| | | |
|---|---|---|
| CN | 103168405 | 6/2013 |
| CN | 103248131 | 8/2013 |
| CN | 103972993 | 8/2014 |
| CN | 104347259 | 2/2015 |
| EP | 2211438 | 7/2010 |
| EP | 2256895 | 12/2010 |
| JP | 5510608 | 6/2014 |
| KR | 20080081480 | 9/2008 |
| WO | WO 08/032746 | 3/2008 |
| WO | WO 09/081126 | 7/2009 |

* cited by examiner

CONFIGURABLE WIRELESS TRANSMITTER DEVICE

CROSS-REFERENCE TO RELATED APPLICATIONS

This application is a continuation of U.S. patent application Ser. No. 16/189,955, filed Nov. 13, 2018, and entitled "Configurable Wireless Transmitter Device, which is a continuation of U.S. patent application Ser. No. 15/274,610, filed Sep. 23, 2016, and entitled "Configurable Wireless Transmitter Device," now U.S. Pat. No. 10,158,244, which claims the benefit under 35 U.S.C. § 119(e) of U.S. Provisional Patent Application No. 62/232,280, filed on Sep. 24, 2015, and entitled "Configurable Wireless Transmitter Device," the contents of which are incorporated by reference as if fully disclosed herein.

FIELD

The described embodiments relate generally to wireless energy transfer. More particularly, the present embodiments relate to a transmitter device that is configurable to operate with one or more receiver devices.

BACKGROUND

Some electronic devices are configured to receive energy or power wirelessly. The user may place the electronic device on a charging surface of a wireless charging or transmitter device to transfer energy from the transmitter device to the electronic device. The transmitter device transfers energy to the electronic device through inductively coupling between a transmitter coil in the transmitter device and a receiver coil in the electronic device.

Some wireless transmitter devices are constructed to only transfer energy to a particular receiver device. This can increase the cost to a user who uses wireless energy transfer for multiple electronic devices. Because each electronic device may operate only with a particular charging device, a user may be required to purchase multiple charging devices.

SUMMARY

A wireless transmitter device is configurable and operable to transfer energy to one receiver device or to two or more receiver devices at the same time. For example, in one embodiment the transmitter device is configured to enable one or more sections of a charging surface to transfer energy to one or more receiver coils by selectively energizing one or more conductive traces in the transmitter device based on the position of the receiver device on the charging surface. The size and shape of each section of the charging surface that is used to transfer energy to a receiver device can change dynamically based on each receiver device. Additionally, the process of transferring energy to each receiver device may be adjusted during energy transfer based on conditions specific to each receiver device.

In one aspect, a wireless transmitter device can include a substrate that includes conductive traces arranged in a pattern. Drive circuitry is operably connected to the conductive traces and to a processing device. The processing device may be configured to select a first conductive trace based on a position of a first receiver device on a charging surface of the wireless transmitter device, determine a first drive signal characteristic of a first drive signal associated with the first conductive trace, and cause the drive circuitry to provide the first drive signal to the first conductive trace to transfer energy from the first conductive trace to the first receiver device. The first drive signal characteristic may include a frequency, a phase, and an amplitude of the first drive signal.

The processing device may also be configured to select a second conductive trace based on a position of a second receiver device on the charging surface, determine a second drive signal characteristic of a second drive signal associated with the second conductive trace, and to cause the drive circuitry to provide the second drive signal to the second conductive trace to transfer energy from the second conductive trace to a second receiver coil in the second receiver device. The second drive signal characteristic may include a frequency, a phase, and an amplitude of the second drive signal.

In one embodiment, the conductive traces can be arranged in a grid of intersecting horizontal and vertical conductive traces within a substrate. Each conductive trace can conduct a current in either direction. In some instances, a single conductive trace can transfer energy to a receiver coil when the conductive trace conducts an alternating current (AC) signal. In other situations, two or more conductive traces may be selected to conduct AC signals and transfer energy to a receiver coil. By energizing select conductive traces in particular patterns, for example by energizing intersecting conductive traces, "pseudo-coils" or transmitter structures of varying sizes, shapes, and locations can be created on the charging surface.

A pseudo-coil includes two or more conductive traces that have been selected to conduct an AC signal. A pseudo-coil is similar to a conventional transmitter coil in that a pseudo-coil is a transmitter structure that generates a varying magnetic field when an alternating current (AC) signal flows through the conductive traces to transfer energy to a receiver coil, but a pseudo-coil does not include a wire arranged in many turns to form a winding like a transmitter coil.

A transmitter structure or pseudo-coil can have a closed shape or an open shape. For example, an open-shaped pseudo-coil can be two parallel or intersecting conductive traces that generate magnetic fields when an AC signal flows through the conductive traces. The magnetic fields and/or a net magnetic field may couple with one or more receiver coils in a receiver device that is positioned on the charging surface. As another example, an AC signal can flow through four conductive traces to create a square or rectangular pseudo-coil (a closed shape).

By selectively energizing one or more conductive traces, only a section of the charging surface is used to transfer energy to a receiver device. Additionally, multiple sections of the charging surface can be used to transfer energy to different receiver devices by selectively conducting drive signals through one or more conductive traces associated with each section.

The magnetic flux associated with each magnetic field can be tailored for a particular receiver device. Additionally, when a magnetic field is created near another magnetic field, the two magnetic fields (or portions of the two magnetic fields) interact and alter the direction and magnitude of the net magnetic field. Thus, in some embodiments, magnetic flux can be steered toward a particular section of the charging surface and/or a receiver coil. Steering the magnetic fields associated with two or more conductive traces permits a receiver device to receive energy from a section of the charging surface regardless of the position and orientation of a receiver device on the charging surface (e.g., if the receiver coil is perpendicular or parallel to the charging surface). For optimum energy transfer, the magnetic flux produced by multiple conductive traces can be steered to produce a net magnetic flux that is normal to a receiver coil.

In yet another aspect, a method of operating a wireless transmitter device may include selecting a first set of conductive traces in a plurality of conductive traces based on a position of a first receiver device on a charging surface of the wireless transmitter device, where the first set of conductive traces form a first transmitter structure. A first set of drive signals are provided to the first set of conductive traces to transfer energy from the first transmitter structure to the first receiver device. A second set of conductive traces in the plurality of conductive traces are selected based on a position of a second receiver device on the charging surface of the wireless transmitter device, where the second set of conductive traces form a second transmitter structure. A second set of drive signals are provided to the second set of conductive traces to transfer energy from the second transmitter structure to the second receiver device.

In another aspect, a wireless transmitter device can include a first substrate including a plurality of conductive traces arranged in a pattern and a second substrate positioned below the first substrate and including drive circuitry operably connected to the plurality of conductive traces and configured to provide drive signals to the plurality of conductive traces. A ferrite sheet may be positioned between the first and second substrates, and a via formed from the first substrate through the ferrite sheet to the second substrate to provide a conductive connector between the plurality of conductive traces and the drive circuitry. A processing device is operably connected to the drive circuitry and configured to select a first conductive trace and a second conductive trace in the plurality of conductive traces based on a position of a receiver device on a charging surface of the wireless transmitter device, where the first and the second conductive traces form a transmitter structure. The processing device is further configured to determine a first drive signal characteristic for a first drive signal associated with the first conductive trace, determine a second drive signal characteristic for a second drive signal associated with the second conductive trace, and cause the drive circuitry to provide the first and the second drive signals to the first and the second conductive traces, respectively, to transfer energy from the transmitter structure to a receiver coil in the receiver device.

In another aspect, a method of operating a wireless transmitter device can include determining if a transfer of energy to a first receiver device has a higher priority than a transfer of energy to a second receiver device, and if the transfer of energy to the first receiver device has higher priority, selecting a first conductive trace and a second conductive trace in a plurality of conductive traces positioned in or below a charging surface of the transmitter device based on a position of the first receiver device on the charging surface. The first and the second conductive traces form a first transmitter structure. A first drive signal characteristic of a first drive signal associated with the first conductive trace may be determined and a second drive signal characteristic of a second drive signal associated with the second conductive trace can be determined. The first and the second drive signals can be applied to the first and the second conductive traces, respectively, to transfer energy from the first transmitter structure to a receiver coil in the first receiver device. After the process of transferring energy to the first receiver device is complete or is in process for a given period of time, a third conductive trace and a fourth conductive trace in the plurality of conductive traces may be selected based on a position of the second receiver device on the charging surface. The third and the fourth conductive traces form a second transmitter structure. A third drive signal characteristic of a third drive signal associated with the third conductive trace can be determined and a fourth drive signal characteristic of a fourth drive signal associated with the fourth conductive trace can be determined. The third and the fourth drive signals may be applied to the third and the fourth conductive traces, respectively, to transfer energy from the second transmitter structure to a receiver coil in the second receiver device. In some embodiments, the first and second drive signal characteristics of the first and second drive signals can be determined based on the priority of each receiver device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
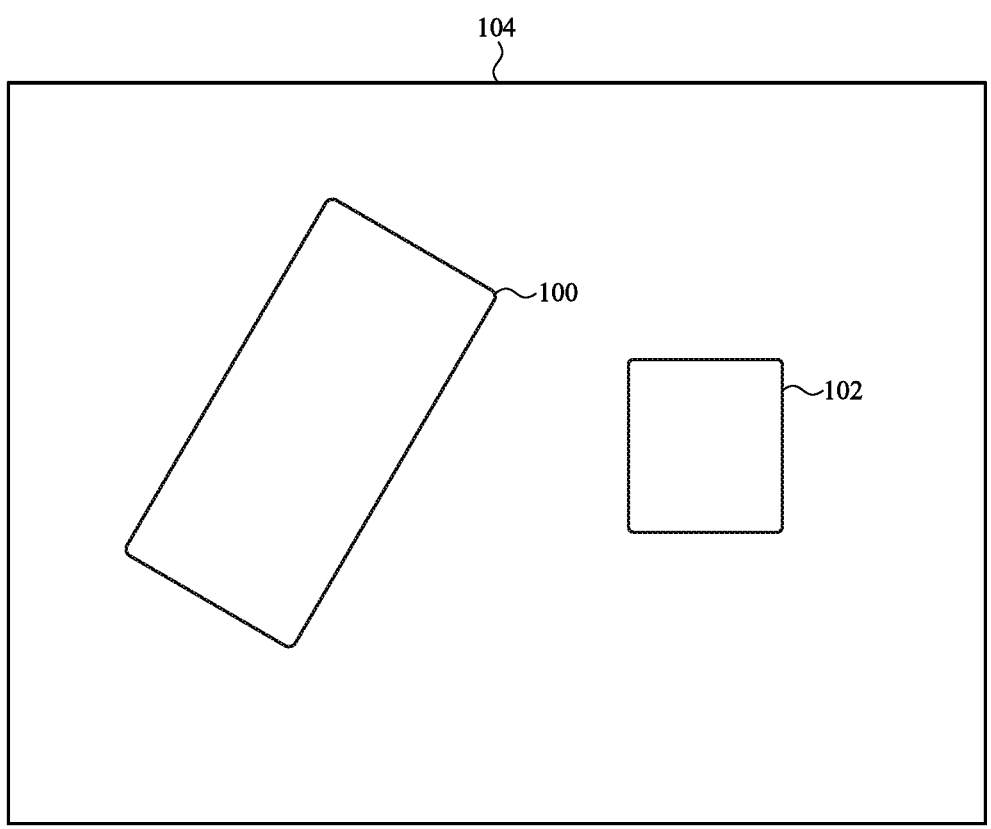
FIG. 1 shows a plan view of two electronic devices on a charging surface of a wireless transmitter device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a transmitter device in a wireless energy transfer system. The wireless transmitter device can be configured to transfer energy to one receiver device or to multiple receiver devices at the same time. The transmitter device is configured to enable one or more sections of the charging surface to transfer energy by selecting one or more conductive traces in the transmitter device to conduct an alternating current (AC) drive signal based on the position of a receiver device on the charging surface. Enabling only a section of a charging surface for energy transfer allows the transfer of energy to a receiver device to be tailored for that specific receiver device based on the energy transfer requirements of the receiver device. The size and shape of each section of the charging surface that is used to transfer energy to a receiver device can change dynamically based on each receiver device.

Additionally, the transmitter device may be configured to transfer energy to a receiver device regardless of the position and orientation of the receiver device on the charging surface of the transmitter device. For example, in some instances a receiver device may be positioned on the charging surface such that a receiver coil in the receiver device is parallel to the charging surface. In other situations, a receiver device may be positioned on the charging surface such that a receiver coil in the receiver device is perpendicular to the charging surface or at an angle with respect to the charging surface. The transmitter device is configured to enable one or more sections of the charging surface to transfer energy by selectively choosing or configuring one or more conductive traces in the transmitter device based on the position of a receiver device on the charging surface.

In some embodiments, energy transfer may be optimized for different receiver devices that are receiving energy from a transmitter device at the same time. A first set of conductive traces can be energized to transfer energy to a first receiver device and a second set of conductive traces can be energized to transfer energy to a second receiver device. Each set of conductive traces may include one or more conductive traces. One or more characteristics of the AC drive signal received by each conductive trace in the first set may be chosen to optimize the energy transfer process for the first receiver device. The one or more characteristics of an AC drive signal can include (but are not limited to) the frequency, the phase, and the amplitude of the AC drive signal. Similarly, one or more characteristics of the AC drive signals received by each conductive trace in the second set may be chosen to optimize the energy transfer process for the second receiver device.

In some embodiments, energy transfer can be optimized by creating transmitter structures or pseudo-coils of varying sizes, shapes, and locations. A transmitter structure or pseudo-coil may be created by energizing select conductive traces in particular patterns, for example by energizing intersecting conductive traces. As described earlier, a pseudo-coil includes two or more conductive traces that have been selected to conduct an AC signal. A pseudo-coil or transmitter structure is similar to a conventional transmitter coil in that a pseudo-coil generates a varying magnetic field when an alternating current (AC) signal flows through the conductive traces to transfer energy to a receiver coil. But a pseudo-coil does not include a wire arranged in many turns to form a winding like a transmitter coil.

A transmitter structure or pseudo-coil can have a closed shape or an open shape. For example, an open-shaped pseudo-coil can be two parallel or intersecting conductive traces that generate magnetic fields when an AC signal flows through the conductive traces. The magnetic fields and/or a net magnetic field may couple with one or more receiver coils in a receiver device positioned on the charging surface to transfer energy to the receiver device. As another example, an AC signal can flow through four conductive traces to create a square or rectangular pseudo-coil (a closed shape). The magnetic fields produced by the square or rectangular pseudo-coils can couple with one or more receiver coils in a receiver device positioned on the charging surface to transfer energy to the receiver device.

In some embodiments, the process of transferring energy to each receiver device may be adjusted during energy transfer based on conditions specific to each receiver device. For example, when a transmitter device is transferring energy contemporaneously to two receiver devices, the battery in a first receiver device may be fully charged before the battery in a second receiver device is fully charged. The one or more conductive traces that are transferring energy to the first receiver device can stop transferring energy while the one or more conductive traces that are transferring energy to the second receiver device continue to transfer energy. As another example, one receiver device may be able to receive a greater amount of energy compared to the amount of energy another receiver device can receive.

In some embodiments, energy transfer to multiple receiver devices may be prioritized based on one or more conditions of the receiver devices. For example, a first receiver device may receive energy, or receive a greater amount of energy, than a second receiver device because the charge level of the battery in the first receiver device is lower than the charge level of the battery in the second receiver device. Alternatively, a battery in a first receiver device may be a fast charging battery while the battery in the second receiver device is not a fast charging battery. The transmitter device may transfer energy to the first receiver device until the fast charging battery is fully charged, and once the fast charging battery is fully charged, begin transferring energy to the second receiver device. Alternatively, a user can prioritize his or her receiver devices so that when two receiver devices are on a charging surface of a transmitter device, the receiver device with the highest priority receives a greater amount of energy than the second receiver device.

A wireless transmitter device can include conductive traces formed within a charging surface and/or in one or more layers below a charging surface. The conductive traces can be arranged in any given pattern. As one example, the conductive traces can be arranged in a grid of intersecting horizontal and vertical conductive traces. In some embodiments, one or more sections of a charging surface may be associated with areas that do not include conductive traces. In other words, one or more sections of a charging surface may not be able to transfer energy because conductive traces are not positioned below those sections.

The conductive traces are individually addressable such that different drive signals may be conducted by different traces. Thus, each conductive trace may be independently energized to selectively enable one or more sections of a charging surface to transfer energy. The magnetic field generated around each selected conductive trace can couple inductively with a receiver coil positioned adjacent to (e.g., at least partially over) the selected section to transfer energy from the transmitter device to the receiver device.

In some embodiments, energy can be transferred from the transmitter device to a receiver device for wireless charging of the receiver device and/or for transmitting communication and/or control signals to the receiver device. A receiver device may transfer energy to a transmitter device to transmit communication and/or control signals to the transmitter device.

These and other embodiments are discussed below with reference to FIGS. 1-13. However, those skilled in the art will readily appreciate that the detailed description given herein with respect to these Figures is for explanatory purposes only and should not be construed as limiting.

FIG. 1 depicts a plan view of two electronic devices on a charging surface of a wireless transmitter device. A first receiver device 100 and a second receiver device 102 are positioned on the charging surface 104. The charging surface 104 is configured to wirelessly transfer energy to the first and second receiver devices 100, 102 at the same time. For example, the charging surface 104 can transfer energy to the first and second receiver devices 100, 102 to charge a battery in each receiver device.

The requirements for transferring energy wirelessly to the first receiver device 100 can differ from the energy transfer requirements of the second receiver device 102. For example, the amount of energy that can be transferred to each receiver device can differ between the two devices, the amount of time needed to charge a battery in each receiver device may differ, and the input impedance of the load (e.g., a battery) in each receiver device can differ between the two devices. The embodiments disclosed herein provide a wireless transmitter device that can transfer energy to a receiver device or to multiple receiver devices concurrently by selectively energizing one or more conductive traces positioned within or below the charging surface 104. In this manner, only sections of the charging surface are used to transfer energy to the receiver device(s). Additionally, the magnetic field or fields can be tailored for each receiver device based on the position of a receiver device on the charging surface and the energy transfer requirements for that receiver device.

In the illustrated embodiment, the first receiver device 100 is shown as a cellular telephone and the second receiver device 102 is depicted as a watch. Other embodiments are not limited to these example receiver devices. A receiver device can be any electronic device that includes one or more receiver coils integrated into the electronic device. In some embodiments, one or more receiver coils can be integrated into a case that is positionable around an electronic device. Example receiver devices include, but are not limited to, a game controller, a gaming device, a tablet computing device, a digital camera, a digital music player, a speaker, a wearable health device, a remote control, and an enclosure or case that can be positioned about a portable electronic device.

Figure 2:
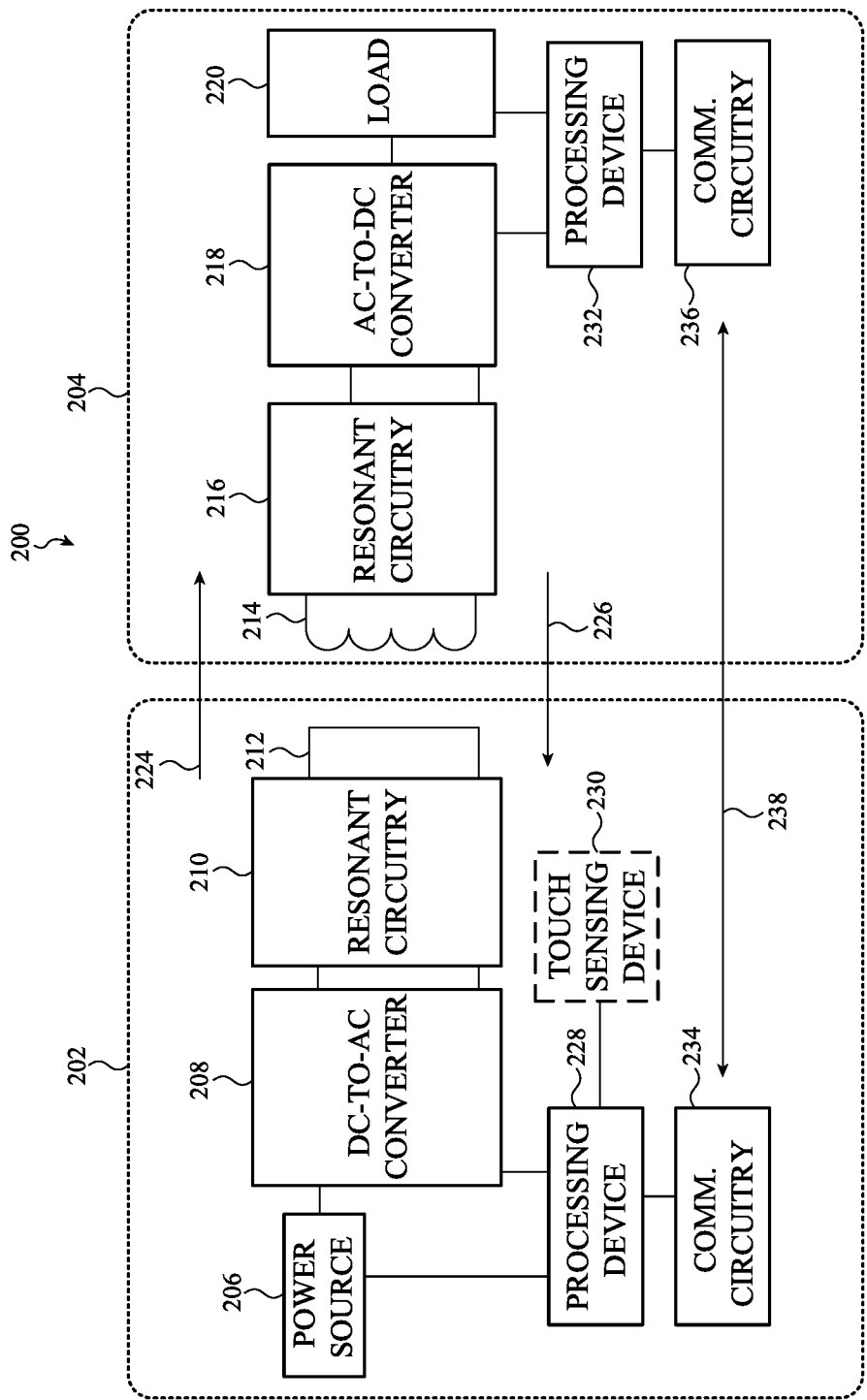
FIG. 2 shows a schematic diagram of a first example of a wireless energy transfer system.

FIG. 2 shows a schematic diagram of a first example of a wireless energy transfer system. The system 200 includes a transmitter device 202 and a receiver device 204. The transmitter device 202 includes a direct current (DC) power source 206 operably connected to a DC-to-AC converter 208. As described earlier, an example power source includes, but is not limited to, one or more batteries or another electronic device that is connected to the transmitter device 202 by a connector or cord. Other embodiments may use an AC power source 206 and omit the DC-to-AC converter 208 or connect an AC-to-DC converter between the AC power source 206 and the DC-to-AC converter 208.

Any suitable type of a DC-to-AC converter 208 may be used in the transmitter device 202. For example, the DC-to-AC converter 208 can be constructed as an H bridge in one embodiment. The DC-to-AC converter 208 is operatively connected to transmitter resonant circuitry 210. In some embodiments, the power source 206, the DC-to-AC converter 208, and the transmitter resonant circuitry 210 collectively are known as a drive circuit. In other embodiments, one or more of these components may be omitted from a drive circuit. For example, a power source can be shared by multiple drive circuits.

The transmitter resonant circuitry 210 is operatively connected to a conductive trace 212 that is selectively energized for energy transfer.

The receiver device 204 can include a receiver coil 214 operably connected to receiver resonant circuitry 216. The receiver resonant circuitry 216 is operatively connected to an AC-to-DC converter 218. Any suitable type of AC-to-DC converter may be used. For example, the AC-to-DC converter can be constructed as a diode bridge in one embodiment.

A load 220 is operably connected to the output of the AC-to-DC converter 218. The load 220 is a rechargeable battery in one embodiment. Other embodiments can use a different type of load. For example, the load 220 may represent one or more system components that use the power received from the receiver coil 214.

Power or energy is transferred through inductive coupling between the conductive trace 212 and the receiver coil 214 (energy transfer represented by arrow 224). Essentially, energy is transferred from the conductive trace 212 to the receiver coil 214 by conducting an alternating current (AC) or signal through the conductive trace 212 to create a varying magnetic field. Because the signal is an alternating current, the direction of the magnetic field changes based on the direction of the AC signal. The varying magnetic field produces an AC current in the receiver coil 214. The AC signal in the receiver coil 214 is received by the AC-to-DC converter 218, which converts the AC signal into a DC signal. In embodiments where the load 220 is a rechargeable battery, the DC signal is used to charge the battery.

Additionally or alternatively, the transferred energy can be used to transmit communication signals between the transmitter and receiver devices (communication signals represented by arrow 226). For example, a receiver device may use load modulation to transfer communication signals (e.g., control and/or status data) from the receiver device to the transmitter device. As one example, a receiver device can apply a controlled pulsed load across the receiver coil, which results in an amplitude modulation of the voltage on the conductive trace. The transmitter device (e.g., a processing device in the transmitter device) can detect and demodulate the amplitude modulation.

Additionally or alternatively, a receiver device may transfer a brief burst of energy (a "ping") to the transmitter device to inform the transmitter device of the presence of the receiver device, or a transmitter device may transfer a ping to the receiver device to determine if the receiver device is ready to receive energy. Additionally or alternatively, a transmitter device can use phase shift keying, frequency modulation and the like to transmit communication signals from the transmitter device to the receiver device.

A processing device 228 in the transmitter device 202 can be operatively connected to the power source 206 and/or the DC-to-AC converter 208. Although not shown in FIG. 2, the processing device 228 may be operatively connected to other components (e.g., a display, memory) in the transmitter device 202. The processing device 228 may control and/or monitor the power produced by the power source 206. Additionally or alternatively, the processing device 228 can control or monitor the operation of the DC-to-AC converter 208. As one example, when the DC-to-AC converter 208 is configured as an H bridge, the processing device 228 may control the opening and closing of the switches in the H Bridge.

In some embodiments, the processing device 228 can be operatively connected to a touch sensing device 230. The touch sensing device 230 may be configured to detect touch and/or pressure or force on a charging surface of the transmitter device 202. As one example, the touch sensing device 230 can detect the presence and location of an object that is in contact with the charging surface.

A processing device 232 in the receiver device 204 can be operatively connected to the AC-to-DC converter 218 and/or the load 220. Although not shown in FIG. 2, the processing device 232 may be operatively connected to other components (e.g., a sensor, memory) in the receiver device 204. The processing device 232 may control or monitor the operation of the AC-to-DC converter 218 and/or the load 220. As one example, the processing device 232 may monitor the charge level on the load 220 when the load 220 is configured as a rechargeable battery.

Communication circuitry 234, 236 may be operatively connected to the processing devices 228, 232 in the transmitter and receiver devices 202, 204, respectively. The communication circuitry 234, 236 can be used to establish a communication channel 238 between the transmitter device 202 and the receiver device 204. As described earlier, energy transfer can be used for communication between the transmitter and receiver devices. The communication channel 238 is an additional or alternate communication mechanism that is separate from the transfer of energy. The communication channel 238 can be used to convey information from the transmitter device 202 to the receiver device 204, and vice versa. The communication channel 238 may be implemented as a physical or wired link, or as a wireless link. The communication channel 238 may be configured as any suitable communication channel, such as, for example, Near Field Communication, Bluetooth, and Infrared.

Although only one power source 206, DC-to-AC converter 208, transmitter resonant circuitry 210, and conductive trace 212 are shown in FIG. 2, a transmitter device can include multiple power sources, DC-to-AC converters, resonant circuitry, and conductive traces. Each conductive trace can be connected to a respective DC-to-AC converter and respective resonant circuitry. Alternatively, two or more conductive traces can share a DC-to-AC converter and resonant circuitry. The power supply may be shared by multiple DC-to-AC converters or a separate power supply can be connected to each DC-to-AC converter. The processing device 228 is operable to select one or more conductive traces to receive an AC drive signal and to provide a select signal to respective drive circuitry for each selected conductive trace to enable the selected conductive trace(s) to transfer energy. The select signal specifies the characteristics for each drive signal associated with each selected conductive trace. The respective drive circuitry then provides the respective drive signal to each selected conductive trace based on the select signal for that selected conductive trace.

Similarly, in some embodiments the receiver device 204 may include multiple receiver coils, resonant circuitry, and AC-to-DC converters. In some embodiments, a receiver device can include a conductive trace or one or more pseudo-coils instead of, or in addition to, a receiver coil or coils. Each receiver coil or conductive trace can be connected to a respective AC-to-DC converter and respective resonant circuitry ("drive circuitry"). Alternatively, two or more receiver coils (or conductive traces) may share an AC-to-DC converter and resonant circuitry.

Figure 3:
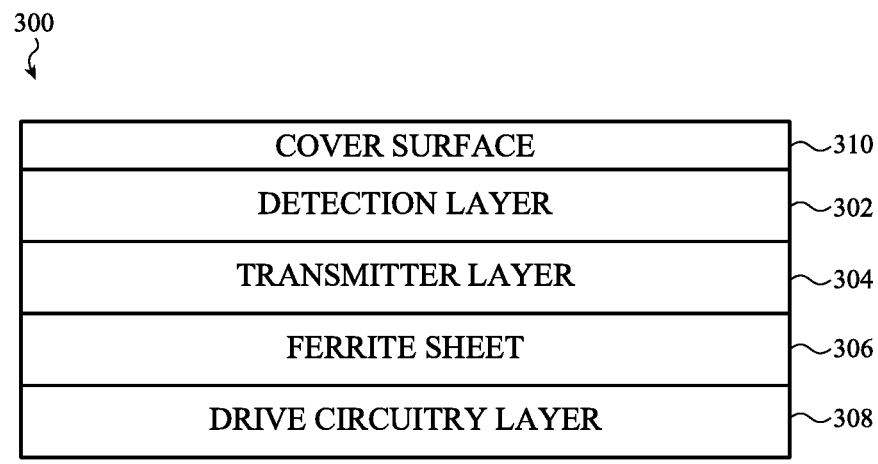
FIG. 3 shows one example of a wireless transmitter device.

FIG. 3 shows one example of a wireless transmitter device. In the illustrated embodiment, the transmitter device 300 can include a cover surface 310, a detection layer 302 positioned below the cover surface 310, one or more transmitter layers 304 positioned below the detection layer 302, a ferrite sheet 306 positioned below the transmitter layer(s) 304, and one or more layers of drive circuitry 308 positioned below the ferrite sheet 306. The cover surface 310 may act as a charging surface on which a receiver device can be placed. The cover surface 310 may provide a physical barrier for the underlying layers and protect the underlying layers from damage and contaminants, such as water and dirt.

The detection layer 302 can be used to detect the presence of a receiver device and to determine the location of the receiver device on the cover surface 310. The detection layer 302 can include any suitable touch sensing technology, including capacitive touch sensing technology, optical touch sensing technology, and resistive touch sensing technology. The detection layer 302 is optional and may be omitted in some embodiments.

For example, in one embodiment the detection layer 302 includes proximity sensors and/or capacitive touch sensors that detect when an object is in contact with the cover surface 310. The location of the one or more sensors that detect the object can indicate the position of the object on the cover surface 310. In some embodiments, the transmitter device can selectively excite the section of the cover surface 310 corresponding to the location of the object for a short period of time to determine if the object is a receiver device. If the transmitter device receives an acknowledgement signal from the object in response to the excitation, the transmitter device can determine the object is a receiver device.

In another embodiment, the detection layer 302 includes optical sensors that detect the presence or absence of light. For example, a receiver device may include a light source positioned adjacent to a bottom surface of the receiver device. The light source can periodically emit one or more pulses of light when the receiver device is in contact with a surface. The pulses of light may not be visible or objectionable to a user when the pulse(s) of light are emitted toward the surface. One or more optical sensors in the transmitter device can detect the light, and the location of the one or more optical sensors can indicate the position of the receiver device on the cover surface 310.

The one or more transmitter layers 304 can each include multiple conductive traces arranged in any given pattern. The conductive traces may be arranged in any suitable pattern, such as a grid pattern (e.g., intersecting horizontal and vertical traces). Other embodiments can arrange the conductive traces in a different pattern. Additionally, each conductive trace may be formed as a linear or non-linear trace (e.g., include a segment that is curved).

The ferrite sheet 306 can be used as a magnetic shield to protect the drive circuitry positioned below the ferrite sheet 306 from the magnetic flux produced by one or more transmitter layers 304. The ferrite sheet 306 can have a "reflective" function to direct the magnetic fields in an upward direction toward the cover surface 310. Placing the ferrite sheet 306 below the one or more transmitter layers 304 can concentrate the magnetic flux in the area between the one or more transmitter layers 304 and a receiver coil in a receiver device. A ferrite sheet 306 is optional and may be omitted in some embodiments.

The one or more layers of drive circuitry 308 can include drive circuits that provide drive signals to the one or more transmitter layers 304. For example, a drive circuit for a conductive trace can include a DC-to-AC converter and resonant circuitry (e.g., 208 and 210 in FIG. 2). An AC drive signal flows through at least one conductive trace to create a varying magnetic field. As described earlier, the varying magnetic field induces a voltage in a receiver coil in the receiver device.

In some embodiments, the detection layer 302 can be formed with a flexible circuit or other suitable substrate. The one or more transmitter layers 304 may each be formed with a printed circuit board, a flexible circuit, or other suitable substrate. Similarly, the one or more layers of drive circuitry 308 can each be formed with a printed circuit board or other suitable substrate.

In other embodiments, the cover surface 310 and the detection layer 302 may be omitted from a wireless transmitter device. In such embodiments, the top surface of the transmitter layer 304 functions as a charging surface. One or more additional layers of conductive traces can be positioned below the transmitter layer 304.

Other embodiments can configure the transmitter device 300 differently. The ordering or position of the layers may be different. As one example, a layer of drive circuitry can be positioned side-by-side with a transmitter layer instead of below the transmitter layer. As another example, a detection layer may be below a transmitter layer. A transmitter device may include a level of alternation between layers, such as, for example, conductive traces in one section can be above the detection layer while the conductive traces in another section are below the detection layer. And in some embodiments, some of the layers are not formed as distinct layers. For example, the components in the detection layer may be included in a transmitter layer.

Figure 4:
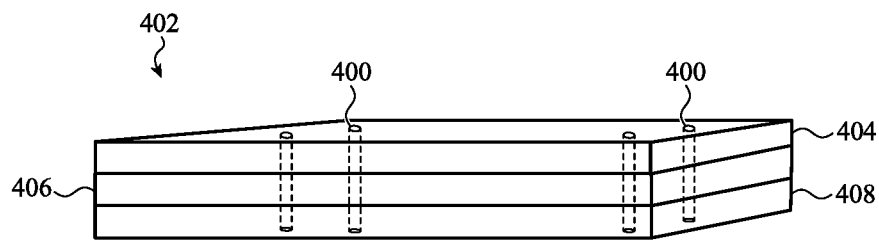
FIG. 4 shows one example of a wireless transmitter device with conductive connections between a transmitter layer and a drive circuitry layer.

In some embodiments, conductive connectors between the drive circuitry and respective conductive traces can be created with (or in) vias formed between a transmitter layer and a respective layer of drive circuitry (see FIG. 4). The transmitter device 402 shown in FIG. 4 includes a single transmitter layer 404, a ferrite sheet 406, and a single layer of drive circuitry 408. The vias 400 are formed through ferrite sheet 406 and electrically connect a drive circuit on the layer of drive circuitry 408 to one or more conductive traces on the transmitter layer 404.

Figure 5:
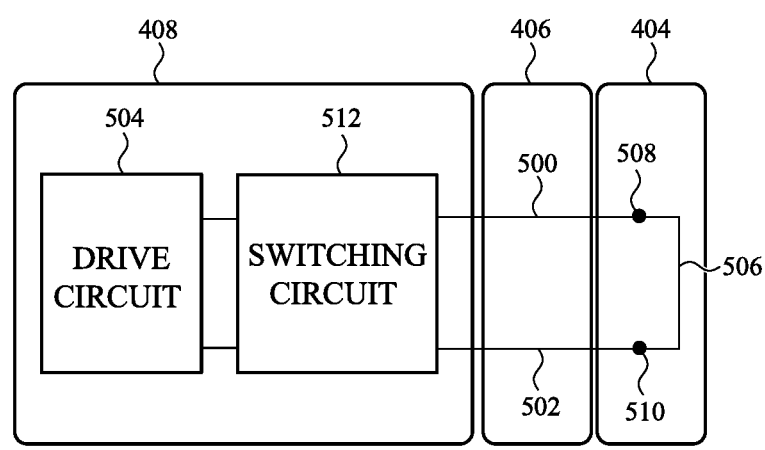
FIG. 5 shows a schematic diagram of the wireless transmitter device shown in FIG. 4.

FIG. 5 shows a schematic diagram of the wireless transmitter device shown in FIG. 4. The conductive connectors 500, 502 can be formed with or in vias to connect a drive circuit 504 to a conductive trace 506 at locations 508, 510. In some embodiments, the drive circuit 504 only connects to the conductive trace 506. In other embodiments, the drive circuit 504 can connect to the conductive trace 506 and to one or more additional conductive traces (not shown). In such embodiments, an AC drive signal can be switched from one conductive trace to another conductive trace by a switching circuit 512. One example of a switching circuit is a multiplexer.

Figure 6:
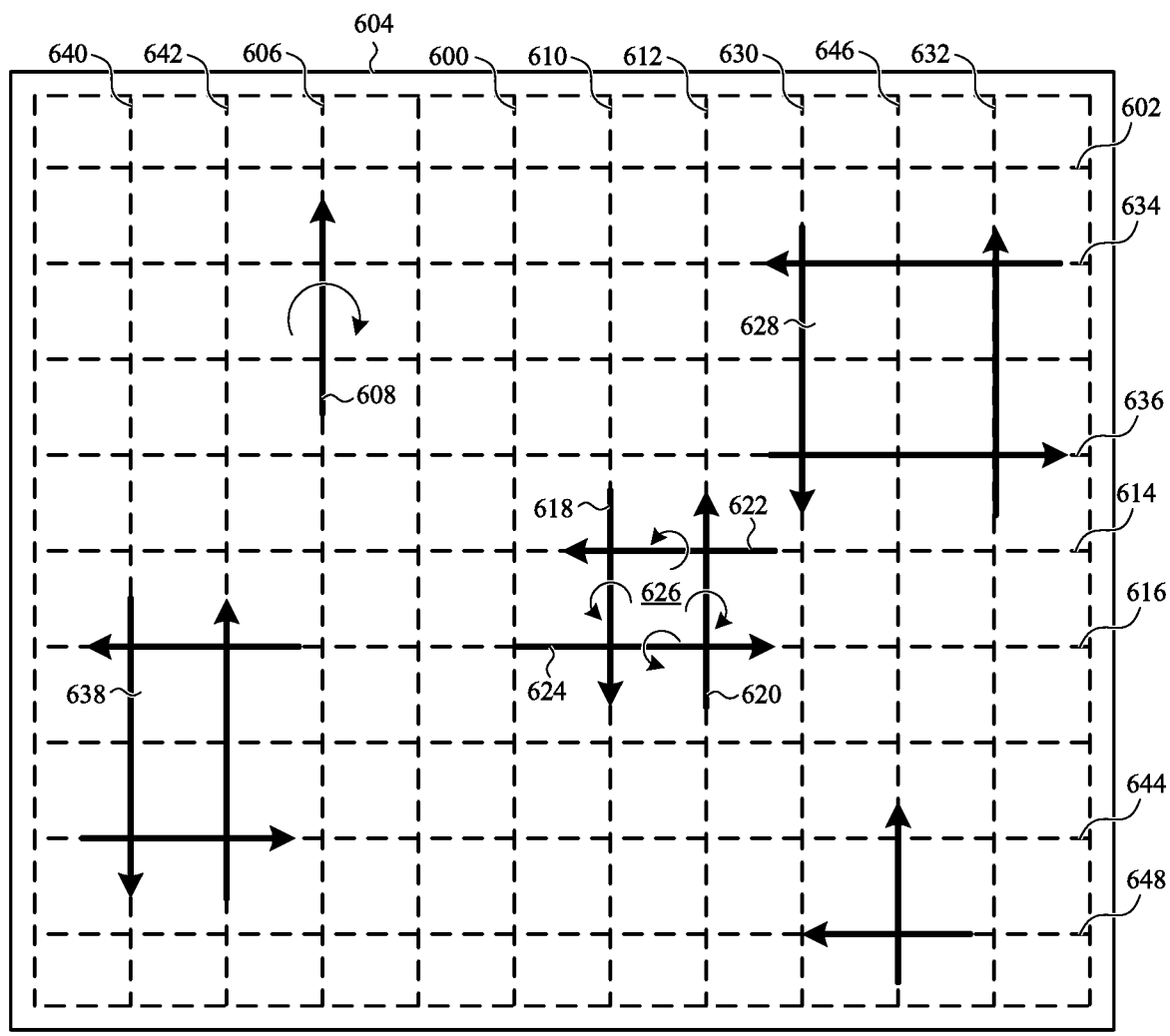
FIG. 6 shows a plan view of a first wireless transmitter device that is suitable for use as the transmitter device shown in FIG. 1.

FIG. 6 shows a plan view of a wireless transmitter device that is suitable for use as the transmitter device shown in FIG. 1. In the illustrated embodiment, a first set of conductive traces 600 and a second set of conductive traces 602 are arranged in a grid pattern within or below the charging surface 604. The first set of conductive traces 600 are linear traces running in one direction (e.g., vertically) and the second set of conductive traces 602 are linear traces running in a second direction (e.g., horizontally). In other embodiments, the conductive traces can be arranged in any suitable pattern or design. Additionally, in some embodiments one or more sections of a charging surface may be associated with areas that do not include conductive traces. In other words, one or more sections of a charging surface may not be able to transfer energy because conductive traces are not positioned below those sections.

A drive signal can flow through one or more conductive traces in a particular section of the charging surface 604 to produce a magnetic field or magnetic fields in that particular section of the charging surface 604. In particular, an AC drive signal may flow through one or more conductive traces in the first set of conductive traces 600, in the second set of conductive traces 602, or in both the first and second sets of conductive traces 600, 602.

As one example, a magnetic field can be produced by conducting an AC drive signal through conductive trace 606. A varying magnetic field is created when the AC drive signal flows through the conductive trace 606. During the time period when the AC signal flows in the direction of the arrow 608, the rotation of the magnetic field is counter-clockwise around the conductive trace 606 (from the perspective of the end of the arrow capped by the triangle). Conversely, when the AC signal flows in the opposite direction of the arrow 608, the rotation of the magnetic field is clockwise around the conductive trace 606. Thus, the section of the charging surface 604 adjacent to the conductive trace 606 can be used to transfer energy to a receiver device. In particular, a receiver coil that is positioned on the charging surface 604 adjacent to the conductive trace 606 may inductively couple with the conductive trace 606 to transfer energy from the conductive trace 606 to the receiver coil.

As another example, AC drive signals can pass through conductive traces 610, 612, 614, 616 to produce a transmitter structure or pseudo-coil. As described earlier, a pseudo-coil or transmitter structure includes two or more conductive traces that have been selected to conduct an AC signal. A transmitter structure or pseudo-coil is similar to a conventional transmitter coil in that a pseudo-coil generates a varying magnetic field when an alternating current (AC) signal flows through the conductive traces to transfer energy to a receiver coil, but a pseudo-coil does not include a wire arranged in many turns to form a winding like a transmitter coil.

In one non-limiting example, during the time periods when the AC drive signal on conductive trace 610 is flowing in the direction of the arrow 618, and the drive signal on conductive trace 612 is flowing in the direction of the arrow 620, and the drive signal on conductive trace 614 is flowing in the direction of the arrow 622, and the drive signal on conductive trace 616 is flowing in the direction of the arrow 624, a 1×1 pseudo-coil 626 is created. During these time periods, a varying magnetic field rotates around each conductive trace 610, 612, 614, 616 in a counter-clockwise direction (from the perspective of the ends of the arrows capped by the triangle). Thus, within the 1×1 pseudo-coil 626 all four magnetic fields are oriented in a direction that is out of the charging surface. A receiver coil positioned on the charging surface 604 over the 1×1 pseudo-coil 626 may inductively couple with the pseudo-coil for energy transfer.

As shown in FIG. 6, transmitter structures or pseudo-coils of varying sizes and locations can be created dynamically by conducting a drive signal through one or more selected conductive traces. In this manner only a section of the charging surface is used to transfer energy to a receiver device. Additionally, multiple sections of the charging surface can be used to transfer energy to different receiver devices by selectively flowing drive signals through one or more conductive traces associated with each section. Thus, sections of a charging surface can be configured to transfer energy to receiver coils of different sizes and shapes concurrently.

For example, a 2×2 pseudo-coil 628 may be produced by transmitting AC drive signals on conductive traces 630, 632, 634, 636 (e.g., when drive signals flow in the directions indicated by the arrows). Additionally or alternatively, a 2×1 pseudo-coil 638 may be produced by conducting AC drive signals on conductive traces 616, 640, 642, 644 (e.g., when drive signals flow in the directions indicated by the arrows). Additionally or alternatively, when AC drive signals flow through conductive traces 646, 648, the conductive trace 646 may transfer energy to a first receiver coil positioned on a section adjacent the conductive trace 646. Similarly, the conductive trace 648 can transfer energy to a second receiver coil disposed on a section adjacent the conductive trace 648, and the location around the intersection of the conductive traces 646, 648 is a pseudo-coil that can be used to transfer energy to a third receiver coil.

The magnetic flux associated with each magnetic field can be tailored for a particular receiver device. The magnetic flux depends at least in part on the frequency, the phase, and the amplitude of an AC drive signal. These characteristics of an AC drive signal may be selected or adjusted to produce a given magnetic flux. Additionally, when a magnetic field is created near another magnetic field, the two magnetic fields (or portions of the two magnetic fields) interact and alter the direction and magnitude of the net magnetic field. Thus, in some embodiments magnetic flux can be steered toward a particular section of the charging surface and/or a receiver coil. Steering the magnetic fields associated with two or more conductive traces permits a receiver device to receive energy from a section of the charging surface regardless of the position and orientation of a receiver device on the charging surface (e.g., if receiver coil is perpendicular or parallel to the charging surface).

Figure 7:
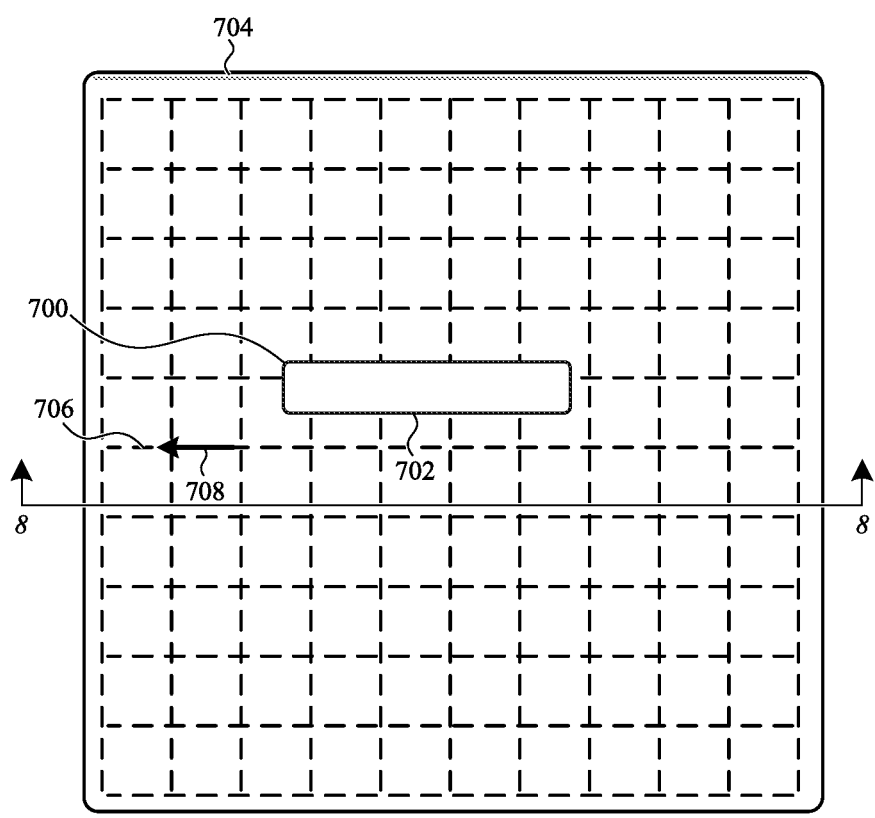
FIG. 7 shows a first plan view of a charging surface with an example receiver device positioned thereon.

FIG. 7 shows a first plan view of a charging surface with an example receiver device positioned thereon. In the illustrated embodiment, the receiver device 700 is depicted as a watch. A receiver coil (not shown) is positioned adjacent to a bottom surface 702 of the receiver device 700. Other embodiments can position the receiver coil at a different location within the receiver device 700.

To transmit energy from the charging surface 704 to the receiver coil, the conductive trace 706 can be selected to receive an AC drive signal to produce a varying magnetic field that rotates around the conductive trace 706. During the time periods when the AC drive signal is flowing in the direction of arrow 708, the magnetic field rotates around the conductive trace 706 in a counter-clockwise direction (from the perspective of the end of the arrow capped by the triangle). As such, the magnetic field will rotate out of the charging surface 704 (e.g., vertically) and towards the bottom surface 702 of the receiver device 700. This magnetic field can inductively couple with the receiver coil to transfer energy to the receiver device 700.

Figure 8:
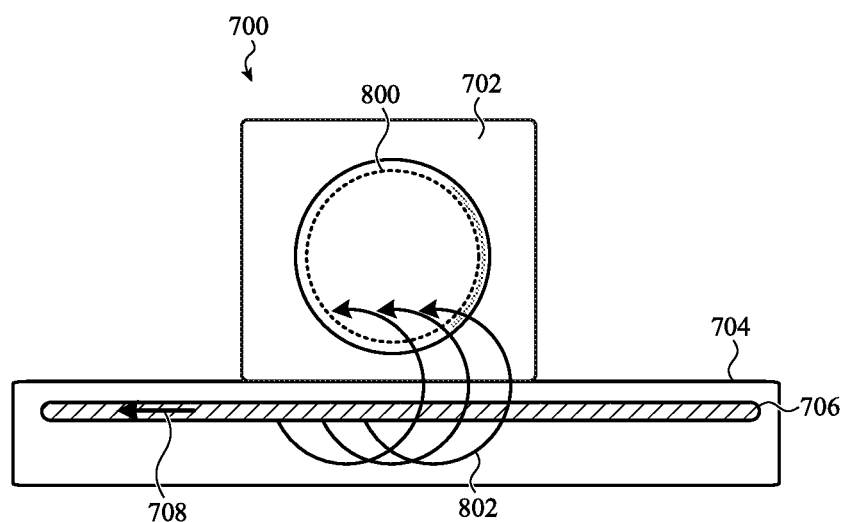
FIG. 8 shows a cross-sectional view of the charging surface and the receiver device taken along line 8-8 in FIG. 7.

FIG. 8 shows a cross-sectional view of the charging surface and the receiver device taken along line 8-8 in FIG. 7. As described previously, a receiver coil 800 is positioned adjacent to the bottom surface 702 of the receiver device 700. When the AC drive signal flows through the conductive trace 706 in the direction of the arrow 708, the conductive trace 706 produces a magnetic field 802. The magnetic field 802 flows out of the charging surface 704 and towards the receiver coil 800. For simplicity, only three arrows are illustrated for the rotation direction of the magnetic field 802. Thus, the receiver coil 800 can inductively couple with the magnetic field 802 produced by the conductive trace 706 in spite of the receiver coil 800 being positioned perpendicular to the charging surface 704.

Figure 9:
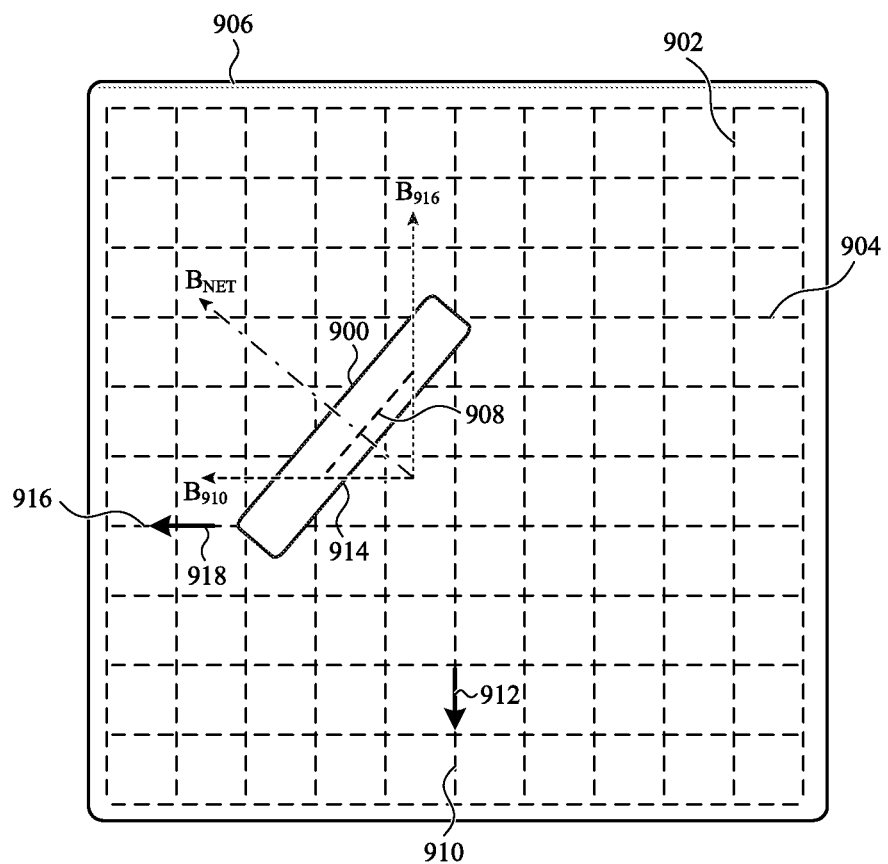
FIG. 9 shows a second plan view of a charging surface with an example receiver device positioned thereon.

FIG. 9 shows a second plan view of a charging surface with an example receiver device positioned thereon. Like the embodiment of FIG. 7, the receiver device 900 is depicted as a watch. In the illustrated embodiment, the receiver device 900 is positioned at an angle with respect to a first set of conductive traces 902 and a second set of conductive traces 904. To transfer energy from the charging surface 906 to the receiver coil 908, the conductive trace 910 can be selected to conduct an AC drive signal. During the time periods when the AC drive signals flow through the conductive trace 910 in the direction shown by the arrows 912, a magnetic field $B_{910}$ rotates around the conductive trace 910 in a counter-clockwise direction (from the perspective of the end of the arrow capped by the triangle). As such, the magnetic field will rotate out of the charging surface 906 and towards the bottom surface 914 of the receiver device 900.

An AC drive signal can also be applied to the conductive trace 916. During the time periods when the AC drive signal flows in the direction of the arrow 918, a magnetic field $B_{916}$ rotates around the conductive trace 916 in a counter-clockwise direction (from the perspective of the end of the arrow capped by the triangle). As such, the magnetic field will rotate out of the charging surface 906 and towards the bottom surface 914 of the receiver device 900.

The magnetic field $B_{910}$ rotating around the conductive trace 910 interacts with the magnetic field $B_{916}$ rotating around the conductive trace 916. Thus, the magnetic fields $B_{910}$, $B_{916}$ can be used to produce a net magnetic field $B_{NET}$. Each magnetic field $B_{910}$, $B_{916}$ can be tailored to steer the net magnetic field $B_{NET}$ toward the receiver coil 908 by selecting one or more characteristics of each AC drive signal to produce a particular net magnetic field that is normal to the receiver coil 908 for optimum energy transfer. As described earlier, the one or more characteristics can include (but are not limited to) the frequency, the phase, and the amplitude of each AC drive signal.

Figure 10:
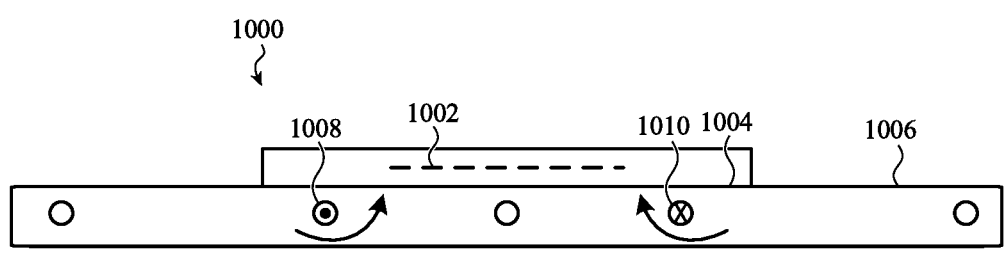
FIG. 10 shows a cross-sectional view of a charging surface with another example receiver device positioned thereon.

FIG. 10 shows a cross-sectional view of a charging surface with another example receiver device positioned thereon. As one example, the receiver device 1000 may be a cellular telephone. A receiver coil 1002 is positioned adjacent to a bottom surface 1004 of the receiver device 1000. Other embodiments can position the receiver coil at a different location within the receiver device 1000.

To transmit energy from the charging surface 1006 to the receiver coil 1002, one or both of the conductive traces 1008 and 1010 can be selected to produce a magnetic field. During the time periods when an AC drive signal flows through the conductive trace 1008 in a first direction (out of the page), a magnetic field rotates around the conductive trace 1008 in a counter-clockwise direction (see arrow). As such, the magnetic field will rotate towards the bottom surface 1004 of the receiver device 1000. Additionally or alternatively, during the time periods when an AC drive signal flows through the conductive trace 1010 in an opposite direction (into the page), a magnetic field rotates around the conductive trace 1010 in a clockwise direction (see arrow). As such, that magnetic field will rotate towards the bottom surface 1004 of the receiver device 1000. The magnetic field(s) can inductively couple with the receiver coil 1002 to transfer energy to the receiver device 1000.

Figure 11:
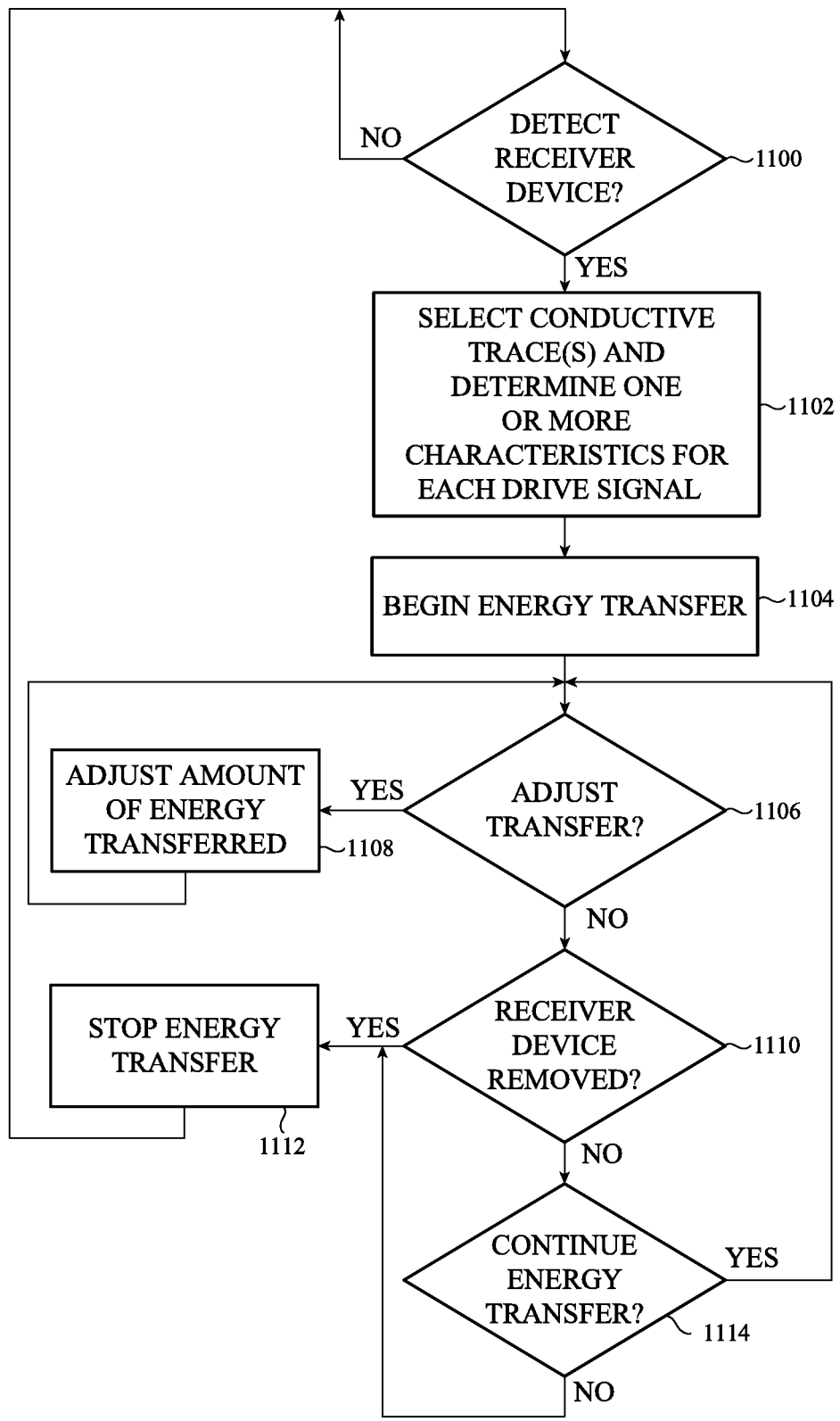
FIG. 11 shows a flowchart of a first method of operating a wireless transmitter device.

FIG. 11 shows a flowchart of a first method of operating a wireless transmitter device. Initially, a determination is made at block 1100 as to whether a receiver device is detected on a charging surface. The presence of a receiver device on the charging surface can be detected using various techniques. For example, in one embodiment a transmitter device can perform a grid search. An AC drive signal can flow through one or more conductive traces associated with a particular section of the charging surface. If a receiver device is positioned in that section and a receiver coil begins to receive energy, the receiver device can transmit an acknowledgement signal to the transmitter device using a communication channel (e.g., communication channel 238 in FIG. 2). If an acknowledgement signal is not received by the transmitter device within a given period of time, an AC drive signal can flow through one or more conductive traces associated with another section of the charging surface. The grid search can continue until an acknowledgement signal is received by the transmitter device.

Additionally, in some embodiments the grid search can be a coarse search where once a given section is determined to have a receiver device nearby, the search can change to a fine search within that section. As one example, the number of conductive traces that are receiving an AC drive signal can repeatedly be reduced and/or changed so that the section used for energy transfer becomes more effective at transferring energy. The fine search can continue until the transfer of energy to the receiver device is at a given efficiency. As one example, the conductive traces that receive an AC drive signal can change such that the section used for energy transfer may shift and move closer to the receiver device. Additionally or alternatively, the conductive traces that receive an AC drive signal can change such that the size of the excited section becomes smaller around the receiver device.

In some embodiments, the battery in a receiver device may not have a sufficient amount of charge to transfer an acknowledgement signal. Thus, when doing a grid search, the one or more conductive traces associated with each section can receive an AC drive signal for an extended period of time. When a section near or below the receiver device is receiving AC drive signals, the extended period of time allows the battery in the receiver device to charge to a sufficient level that permits the receiver device to transmit the acknowledgement signal.

In another example embodiment, a transmitter device can include a detection layer (e.g., detection layer 302 in FIG. 3) that detects the presence of an object on the charging surface and the location of the object on the charging surface. The transmitter device may then apply an AC drive signal to one or more conductive traces near the detected location to determine if the object is a receiver device. If a receiver device is positioned in that location and the receiver coil begins to receive energy, the receiver device can transmit an acknowledgement signal to the transmitter device using a communication channel (e.g., communication channel 238 in FIG. 2).

In some embodiments, a receiver device can transmit energy to the charging surface to inform the transmitter device of the presence and the location of the receiver device. One or more conductive traces can couple with the receiver coil based on the transferred energy, allowing the transmitter device to determine the location of the receiver coil on the charging surface. Alternatively, a magnetic field gradient can be created across a section or the entire charging surface. A receiver device can transmit a signal to the transmitter device that indicates the voltage across the receiver coil. Based on magnetic field gradient and the voltage across the receiver device, the transmitter device can determine a location of the receiver device on the charging surface.

In some embodiments, an exterior surface of a receiver device can include a pattern or design. A detection layer can include image sensors that capture an image of the pattern or design when the receiver device is proximate to or in contact with the charging surface. The location of the image sensor(s) that captured the image of the pattern or design can indicate the position of the receiver device on the charging surface.

Returning to FIG. 11, the process waits at block 1100 if a receiver device is not detected on the charging surface. When a receiver device is detected on the charging surface, the method passes to block 1102 where one or more conductive traces are selected to receive an AC drive signal. Additionally, the characteristics of each AC drive signal are determined at block 1102. As discussed earlier, the characteristics of an AC drive signal may include (but are not limited to) the frequency, phase, and/or amplitude of the drive signal.

A respective AC drive signal is received by the one or more selected conductive traces to begin energy transfer (block 1104). A determination may be made as to whether the transfer of energy is to be adjusted (block 1106). For example, the efficiency of the energy transfer may not be optimal or within the energy transfer requirements for the receiver device. If the transfer of energy is to be adjusted, the process continues at block 1108 where the amount of transferred energy is adjusted. As one example, the amount of transferred energy may be adjusted by modifying at least one characteristic of one or more AC drive signals.

If the transfer of energy will not be adjusted, the method passes to block 1110 where a determination is made as to whether or not the receiver device has been removed from the charging surface. If so, the transfer of energy stops at block 1112. If the receiver device has not been removed from the charging surface, a determination can be made at block 1114 as to whether the transfer of energy is to continue. As one example, a battery in the receiver device may be charged completely. If the transfer of energy will continue, the method returns to block 1106. If the transfer of energy will not continue, the process passes to block 1112 where the transfer of energy ends. The method then returns to block 1100.

The method shown in FIG. 11 can be performed independently for each receiver device on the charging surface, which allows the transfer of energy to each receiver device to be tailored for that receiver device.

Other embodiments are not limited to the process order shown in FIG. 11. Some embodiments can rearrange the order and/or add or delete blocks. As one example, blocks 1106 and 1108 and/or block 1110 can be omitted in some embodiments.

Figure 12:
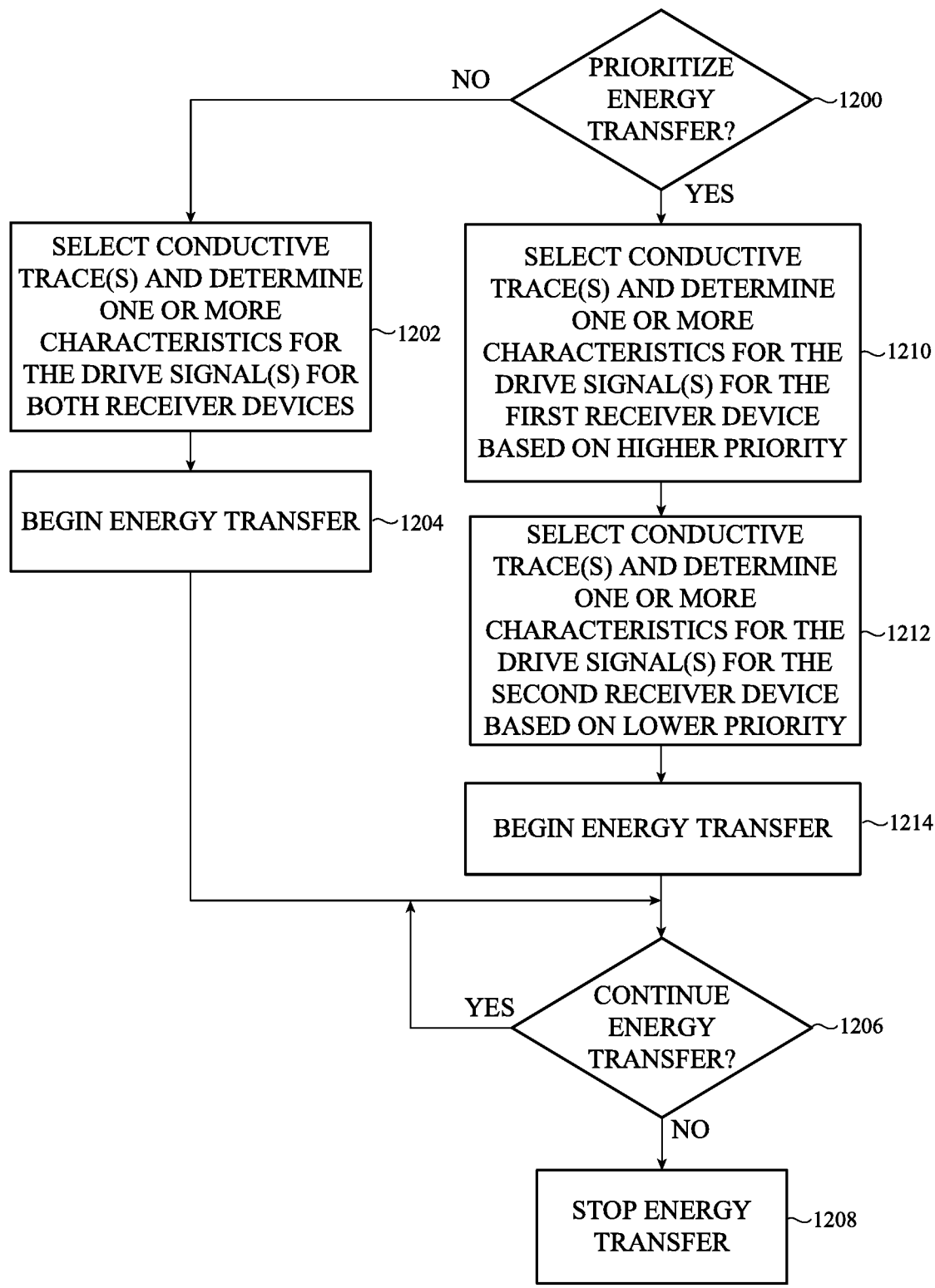
FIG. 12 shows a flowchart of a second method of operating a wireless transmitter device.

FIG. 12 shows a flowchart of a second method of operating a wireless transmitter device. Initially, as shown in block 1200, a determination may be made as to whether energy transfer from a transmitter device to two receiver devices is to be prioritized. As described earlier, energy transfer to multiple receiver devices may be prioritized based on one or more conditions of the receiver devices. For example, a first receiver device may receive energy, or receive a greater amount of energy, than a second receiver device because the charge level of the battery in the first device is lower than the charge level of the battery in the second device. Alternatively, a battery in a first receiver device may be a fast charging battery while the battery in the second receiver device is not a fast charging battery. The transmitter device may transfer energy to the first receiver device until the fast charging battery is fully charged, and once the fast charging battery is fully charged, begin transferring energy to the second receiver device. Alternatively, a user can prioritize his or her receiver devices so that when two receiver devices are on a charging surface of a transmitter device, the receiver device with the highest priority receives a greater amount of energy than the second receiver device.

If energy transfer will not be prioritized, the process passes to block 1202 where one or more conductive traces are selected and one or more characteristics for the drive signal for each selected conductive trace are determined for both receiver devices. The transmitter device then begins energy transfer to the receiver devices (block 1204). Thereafter, a determination may be made as to whether the transfer of energy to one or both receiver devices is to continue. As one example, a battery in one receiver device (or both receiver devices) may be charged completely. In another embodiment, a receiver device may transmit a communication signal to the transmitter device instructing the transmitter device to stop transferring energy (e.g., communication signal sent via communication channel 238 in FIG. 2).

The method waits at block 1206 if energy transfer continues. When the transfer of energy to one or both receiver devices will not continue, the method continues at block 1208 where the transfer of energy to one or both devices stops.

Returning to block 1200, if the transfer of energy will be prioritized, the process passes to block 1210 where one or more conductive traces are selected and one or more characteristics for the drive signal for each selected conductive trace are determined for the receiver device having the highest priority. Next, as shown in block 1212, one or more conductive traces are selected and one or more characteristics for the drive signal for each selected conductive trace are determined for the receiver device having the lower priority. The transmitter device then begins energy transfer to the receiver devices (block 1214). The timing of the energy transfer and/or the amount of energy transferred to each device can be based on the priority of the receiver devices. For example, when the first receiver device has a higher priority than a second receiver device, the transmitter device can transfer a greater amount of energy to the first receiver device and a lesser amount of energy to the second receiver device for a given period of time (e.g., until a battery in the first receiver device is fully charged or has reached a threshold level of charge). The method then performs blocks 1206 and 1208.

Other embodiments are not limited to the process order shown in FIG. 12. Other embodiments can rearrange the order and/or add or delete some blocks. As one example, block 1212 may not be performed until the transfer of energy to the highest priority receiver device is complete, or has been in process for a given period of time (e.g., the battery in the first receiver device is fully charged or has reached a threshold level of charge). In other words, the transfer of energy to each receiver device may not be concurrent but can overlap or be performed sequentially based on the priority of a receiver device.

In some embodiments, a transmitter device may include multiple layers of conductive traces. Including two or more layers of conductive traces in a wireless transmitter device can provide a greater level of granularity when detecting the presence of a receiver device and/or may produce a higher coupling efficiency when coupling a magnetic field to a receiver coil. The conductive traces in one layer can be shifted or offset from the conductive traces in another layer. The shapes, locations, and sizes of the conductive traces can vary within a single layer or within multiple layers. Each layer can be formed in or on a distinct substrate (e.g., printed circuit board) or multiple layers may be formed in one substrate. When multiple layers are formed in one substrate, an insulating material may be positioned between the layers of conductive traces to electrically isolate one layer from the other layer. In some embodiments, the two or more layers of conductive traces can be formed as a single layer in a substrate with insulating material positioned between the conductive traces at points where the conductive traces in the layers intersect.

Figure 13A:
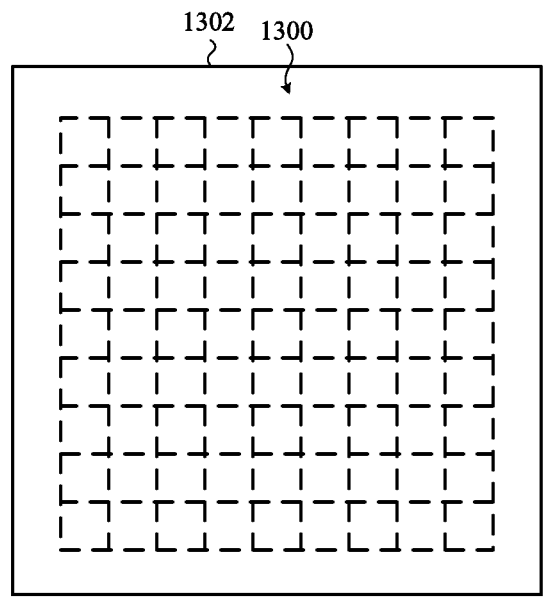
FIGS. 13A-13B show one example of two grids of conductive traces.
Figure 13B:
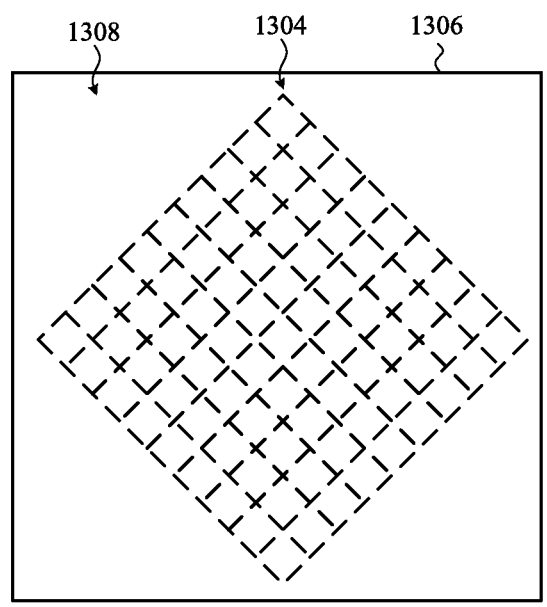

FIGS. 13A-13B show one example of two layers of conductive traces. A first layer of conductive traces 1300 can be formed in or on a first substrate 1302. A second layer of conductive traces 1304 may be formed in or on a second substrate 1306. In the illustrated embodiment, the second layer of conductive traces 1304 is rotated with respect to the first layer of conductive traces 1300 such that the conductive traces in the second substrate 1306 are positioned at an angle with respect to the conductive traces in the first substrate 1302. Additionally, the second substrate 1306 includes sections 1308 where conductive traces are omitted. Thus, sections 1308 are not used to transfer energy to a receiver device.

In some embodiments, the first and second layers of conductive traces 1300, 1304 can be formed in a single substrate. As described earlier, an insulating material may be positioned between the first and second layers of conductive traces to electrically isolate one layer from the other layer. Alternatively, insulating material can be positioned between the conductive traces at points where the conductive traces in one layer intersect the conductive traces in the other layer.

Other embodiments can arrange the conductive traces differently. For example, the spacing between the conductive traces can be the same or can differ. Additionally or alternatively, some of the conductive traces may be linear while other conductive traces are non-linear. Additionally or alternatively, two or more grids of conductive traces can be formed as layers of conductive traces in a single substrate. In such embodiments, an insulating material is positioned between the layers of conductive traces to electrically isolate one layer from the other layer. In some embodiments, the two or more layers of conductive traces can be formed as a single layer in a substrate with insulating material positioned between the conductive traces at points where the conductive traces intersect.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wireless transmitter device comprising:
a first substrate including a parallel set of linear conductive traces;
a second substrate positioned below the first substrate and including drive circuitry operably connected to the parallel set of linear conductive traces and configured to provide drive signals to the parallel set of linear conductive traces; and
a processing device operably connected to the drive circuitry and configured to:
select a first linear conductive trace from the parallel set of linear conductive traces based on a position of a receiver device on a charging surface of the wireless transmitter device;

select a second linear conductive trace from the parallel set of linear conductive traces based on the position of the receiver device;
cause the drive circuitry to drive the first linear conductive trace with a first drive signal; and
cause the drive circuitry to drive the second linear conductive trace with a second drive signal, the first drive signal and the second drive signal flowing in opposite directions and configured to transfer energy to a receiver coil in the receiver device.

2. The wireless transmitter device of claim 1, further comprising a detection layer configured to detect the position of the receiver device on the charging surface.

3. The wireless transmitter device of claim 1, wherein the processing device is further configured to:
determine a first drive signal characteristic of the first drive signal; and
determine a second drive signal characteristic of the second drive signal.

4. The wireless transmitter device of claim 3, wherein:
the first drive signal characteristic comprises at least one of:
a first phase of the first drive signal;
a first frequency of the first drive signal; or
a first amplitude of the first drive signal; and
the second drive signal characteristic comprises at least one of:
a second phase of the second drive signal;
a second frequency of the second drive signal; or
a second amplitude of the second drive signal.

5. The wireless transmitter device of claim 1, wherein:
the parallel set of linear conductive traces is a first parallel set of linear conductive traces; and
the wireless transmitter device further comprises a third substrate positioned between the first substrate and the second substrate, the third substrate including a second parallel set of linear conductive traces.

6. The wireless transmitter device of claim 5, wherein the second parallel set of linear conductive traces is oriented perpendicularly to the first parallel set of linear conductive traces.

7. The wireless transmitter device of claim 6, wherein the first parallel set of linear conductive traces and the second parallel set of linear conductive traces form a grid pattern.

8. The wireless transmitter device of claim 5, wherein each of the first substrate, the second substrate, and the third substrate comprises a printed circuit board.

9. A method of operating a wireless transmitter device, the method comprising:
selecting a first set of linear conductive traces in a parallel set of linear conductive traces based on a first position of a first receiver device on a charging surface of the wireless transmitter device, the first set of linear conductive traces forming a first transmitter structure and comprising:
a first linear conductive trace; and
a second linear conductive trace;
providing a first drive signal to the first linear conductive trace of the first set of linear conductive traces and a second drive signal to the second linear conductive trace of the first set of linear conductive traces to transfer energy from the first transmitter structure to the first receiver device, the first drive signal and the second drive signal flowing in opposite directions;
selecting a second set of linear conductive traces in the parallel set of linear conductive traces based on a second position of a second receiver device on the charging surface of the wireless transmitter device, the second set of linear conductive traces forming a second transmitter structure and comprising:
a third linear conductive trace; and
a fourth linear conductive trace; and
providing a third drive signal to the third linear conductive trace of the second set of linear conductive traces and a fourth drive signal to the fourth linear conductive trace of the second set of linear conductive traces to transfer energy from the second transmitter structure to the second receiver device, the third drive signal and the fourth drive signal flowing in opposite directions.

10. The method of claim 9, further comprising:
determining a first drive signal characteristic of the first drive signal and the second drive signal; and
determining a second drive signal characteristic of the third drive signal and the fourth drive signal.

11. The method of claim 10, wherein each of the first drive signal characteristic and the second drive signal characteristic comprises at least one of:
a frequency;
an amplitude; or
a phase.

12. The method of claim 10, further comprising adjusting the first drive signal characteristic of at least one of the first drive signal or the second drive signal to modify an energy transfer to the first receiver device.

13. The method of claim 9, further comprising:
detecting the first position of the first receiver device on the charging surface prior to selecting the first set of linear conductive traces; and
detecting the second position of the second receiver device on the charging surface prior to selecting the second set of linear conductive traces.

14. The method of claim 13, wherein the first position of the first receiver device and the second position of the second receiver device are detected by a detection layer included in the wireless transmitter device.

15. The method of claim 13, further comprising stopping energy transfer to the first receiver device based on a detection layer detecting an absence of the first receiver device on the charging surface.

16. The method of claim 9, further comprising:
determining whether to stop energy transfer to the second receiver device; and
stopping energy transfer to the second receiver device.

17. The method of claim 16, wherein determining whether energy transfer to the second receiver device is to stop comprises determining whether a battery in the second receiver device is charged beyond a threshold.

18. A method of operating a wireless transmitter device, the method comprising:
selecting a first linear conductive trace from a parallel set of linear conductive traces based on a position of a receiver device on a charging surface of the wireless transmitter device;
selecting a second linear conductive trace from the parallel set of linear conductive traces based on the position of the receiver device;
providing a first drive signal to the first linear conductive trace to transfer energy from the wireless transmitter device to the receiver device; and
providing a second drive signal to the second linear conductive trace to transfer energy from the wireless transmitter device to the receiver device, the first drive signal and the second drive signal flowing in opposite directions.

19. The method of claim 18, further comprising:
detecting an absence of the receiver device;
stopping energy transfer from the first linear conductive trace to the receiver device; and
stopping energy transfer from the second linear conductive trace to the receiver device.

20. The method of claim 18, further comprising:
determining a battery of the receiver device is charged beyond a threshold;
stopping energy transfer from the first linear conductive trace to the receiver device; and
stopping energy transfer from the second linear conductive trace to the receiver device.

\* \* \* \* \*